United States Patent [19]

Murakami et al.

[11] Patent Number: 5,003,400
[45] Date of Patent: Mar. 26, 1991

[54] FOCUSING APPARATUS OF VIDEO CAMERA OR THE LIKE

[75] Inventors: Toshio Murakami; Takashi Azumi, both of Yokohama, Japan

[73] Assignee: Hitachi, Ltd., Tokyo, Japan

[21] Appl. No.: 233,011

[22] Filed: Aug. 17, 1988

[30] Foreign Application Priority Data

Aug. 19, 1987 [JP] Japan ................... 62-204033
Oct. 7, 1987 [JP] Japan ................... 62-251473

[51] Int. Cl.⁵ .............................................. H04N 5/232
[52] U.S. Cl. ................................... 358/227; 250/201.1
[58] Field of Search ............... 250/201; 358/227; 350/429

[56] References Cited

U.S. PATENT DOCUMENTS

| | | | |
|---|---|---|---|
| 4,392,726 | 7/1983 | Kimura | 358/227 |
| 4,611,244 | 9/1986 | Hanma et al. | 358/227 |
| 4,695,893 | 3/1987 | Makino et al. | 358/227 |
| 4,717,959 | 1/1988 | Isago | 358/227 |
| 4,842,387 | 6/1989 | Murakami et al. | 358/227 |

*Primary Examiner*—Léon Scott, Jr.
*Attorney, Agent, or Firm*—Antonelli, Terry, Stout & Kraus

[57] ABSTRACT

An electronically-controlled focusing adjustment apparatus including manual focusing adjustment means using a manual focusing adjsutment device such as a variable resistor, focusing lens position detection means, and feedback means for comparing a voltage outputted from a movable terminal of the manual focusing adjustment device with a voltage outputted from the focusing lens position detection means and for feeding back the error between the two voltages to a motor for driving the focusing lens. Desired manual focusing is thus attained with respect to an object located at an arbitrary distance.

18 Claims, 11 Drawing Sheets

ROTATION

FIG. 4B

MOVABLE

FIG. 5A
DETECTOR OF POTENTIOMETER TYPE

FIG. 5B
DETECTOR OF CONTACT ENCODER TYPE

CONDUCTOR LAYER

CONTACT

FOCUSING APPARATUS OF VIDEO CAMERA OR THE LIKE

BACKGROUND OF THE INVENTION

1. FIELD OF THE INVENTION

The present invention relates to a focusing apparatus of a video camera or the like, and in particular to an electronically-controlled focusing apparatus which facilitates focusing using manual manipulation.

2. DESCRIPTION OF THE PRIOR ART

Figure 1:
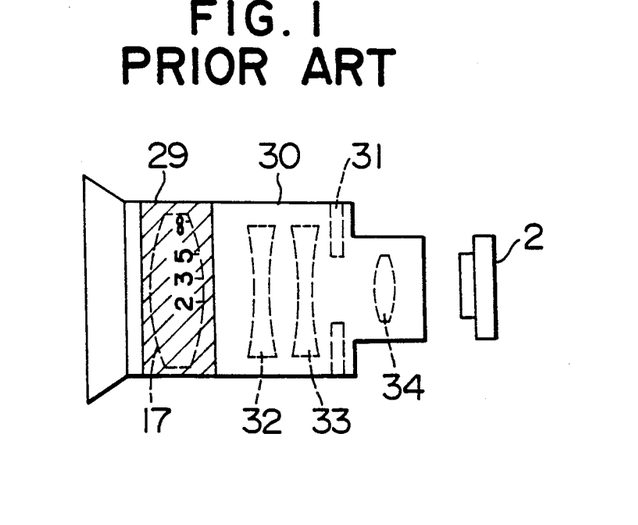
FIG. 1 is a schematic diagram showing an example of configuration of zoom lenses used in a video camera.

As shown in a schematic diagram of FIG. 1, a lens system of a video camera or the like principally comprises a focusing lens (front lens) group 17, a variator lens group 32, a compensator lens group 33, a diaphragm unit 31 and an imaging lens (master lens) group 34. The front lens group 17 functions to focus on each of desired objects to be photographed which are located at arbitrary distances. The variator lens group 32 provides a magnification changing function in accordance with zooming. The compensator lens group 33 moves with zooming and performs correction so as to prevent unsharp focusing during the zooming operation with respect to the object to be photographed. And the focusing lens group 34 functions to focus an image on an image pickup device 2. In a zoom lens used in such a video camera, focus is typically adjusted by movement of the front lens group. Focusing apparatuses are broadly divided into so-called auto focusing apparatuses in which auto focus adjustment is automatically performed and manual focusing apparatuses. In auto focusing apparatuses, an infrared distance measuring scheme or a TTL (Through The Lens) video scheme is used as described in National Technical Report, volume 31, No. 6, December 1985, pp. 65 to 67, for example. In general, the manual focusing apparatus interlocks with the front lens 17 and has such a structure that a distance ring 29 mounted on a lens barrel 30 is rotated and precisely adjusted directly by a hand to attain focusing.

Figure 2:
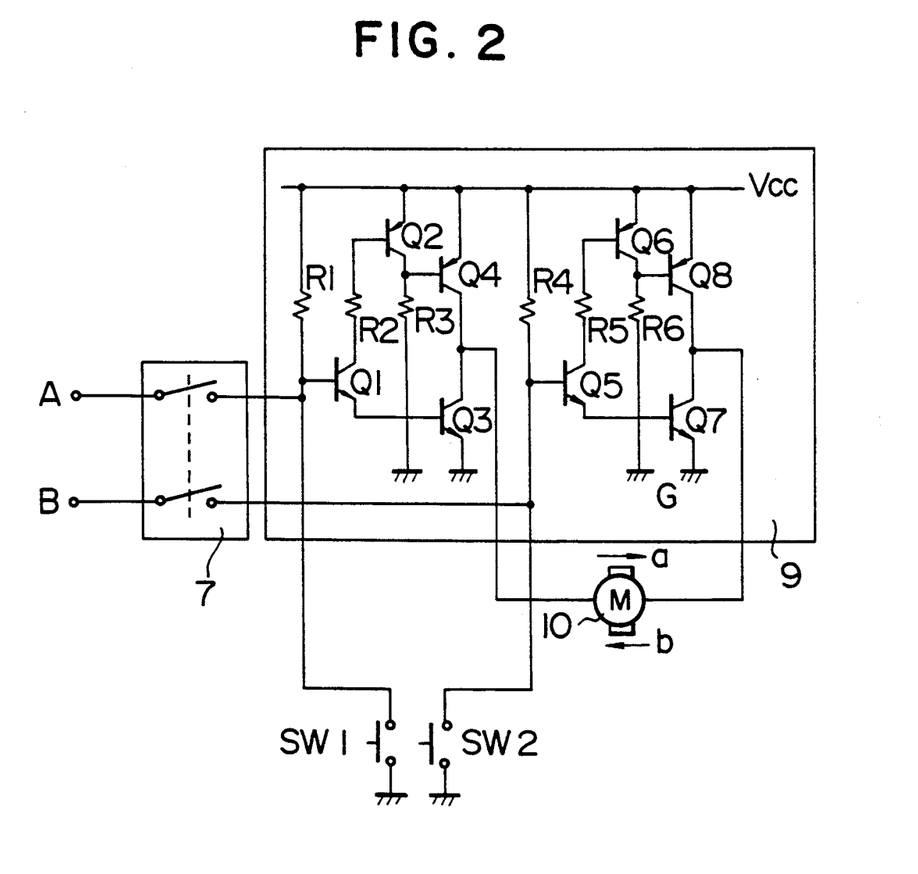
FIG. 2 is a circuit diagram of a motor drive circuit.

On the other hand, demand for convenient to handle, inexpensive, handy and compact commodities has become stronger as the demand for a camera united with a VTR into one body such as a movie camera has rapidly expanded in recent years. As a commodity satisfying such demand, that as described in "Hitachi camera united with VTR, Mastax Movie C30", Hitachi, April 1987, p. 17 is announced. In this commodity, all lenses are incorporated within the movie casing for attaining compactness. Unlike the manual focusing apparatus, therefore, it is impossible to rotate the distance ring of a lens directly by a hand for focusing. Therefore, a so-called power focusing mechanism is adopted so that focusing may be performed by pressing a button switch when manual focusing is desired. By adopting this power focusing mechanism, both the compactness and convenience in handling are attained. Although a specific example of the power focusing mechanism is not described in the former prior art example, this is attained by circuit means as shown in FIG. 2, for example. In FIG. 2, A and B denote terminals used for applying auto focusing control signals. Numeral 7 denotes an automatic/manual changeover switch. $SW_1$ and $SW_2$ denote power focusing button switches. Only while buttons of $SW_1$ and $SW_2$ are pressed are their respective contacts connected. Numeral 10 denotes a focusing motor. Numeral 9 denotes a motor drive circuit comprising transistors Q1 to Q7 and resistors R1 to R6. Under the state that the automatic/manual changeover switch 7 is thrown to the manual side (i.e., the opened switch side) and the button switch 1 is pressed, the transistors Q1, Q2, Q3 and Q8 are in the off-state, and the transistors Q4, Q5, Q6 and Q7 are in the on-state. A motor current flows in a direction indicated by an arrow a through power supply (Vcc), the transistor Q4, the transistor Q7, and ground G to rotate the motor 10 (in a forward direction, for example). Under the state that the button switch 2 is pressed, the transistors Q4, Q5, Q6 and Q7 are in the off-state and the transistors Q1, Q2, Q3 and Q8 are in the on-state on the contrary. In this state, a motor current flows in a direction indicated by an arrow b through the power supply (Vcc), the transistor Q8, the motor 10, the transistor Q3 and the ground G. The rotation direction of the motor 10 is thus reversed. Under the state that the button switches are not pressed, the transistors Q1, Q2, Q3, Q5, Q6 and Q7 are in the on-state, and the transistors Q4 and Q8 are in the off-state. Since both ends of the motor are grounded respectively through the transistors Q3 and Q7, the motor current does not flow and the motor is in the stop state. In power focusing, the forward rotation, the backward rotation and stoppage of the motor are repeated and focusing is performed by fine adjustment, i.e., manual focusing using a motor is performed.

In a focusing apparatus having such a structure that the distance ring of a lens may be manipulated to rotate directly by a hand as described above, focusing can be performed rapidly and with high precision. However, it is difficult to make the commodity compact because of its structure, and it is somewhat inconvenient to handle. On the other hand, the power auto focusing apparatus is excellent in compactness of commodities. However, the power auto focusing apparatus has the disadvantages described below. In the case of power focusing, manipulation of button switches for repetitively causing the forward rotation, the backward rotation and stoppage of the focusing motor to perform focusing is simple and convenient. As a motor in case of power focusing, however, a DC motor is generally used. When it is attempted to move and stop the comparatively heavy front lens by using such a DC motor in accordance with button manipulation, it becomes difficult to stop the front lens at a desired lens position precisely and suitably because of influence of inertia and difference in sense from the case where the distance ring is directly rotated for focusing. If the rotation speed is lowered by decreasing the motor current, the influence of inertia can be reduced to some degree, resulting in focusing with comparatively high precision. However, the focusing time is disadvantageously prolonged.

SUMMARY OF THE INVENTION

An object of the present invention is to provide an electronically-controlled focusing apparatus capable of focusing precisely and suitably while maintaining the compactness of the commodity.

Figure 4A:
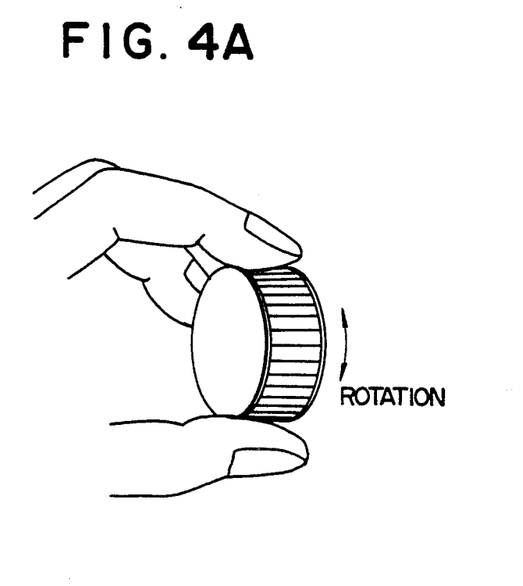
FIGS. 4A and 4B and FIGS. 5A and 5B show examples of manual focusing adjustment devices.
Figure 4B:
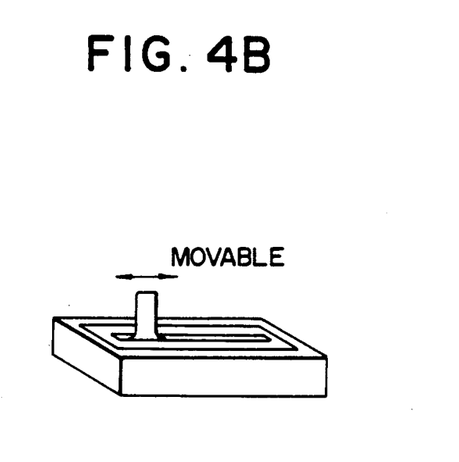
Figure 5A:
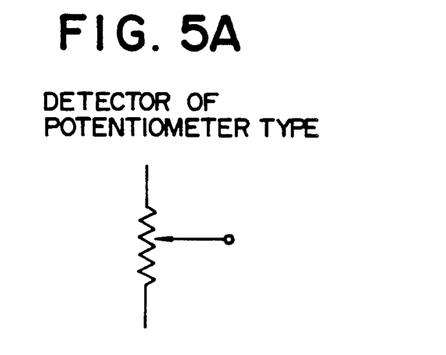
Figure 5B:
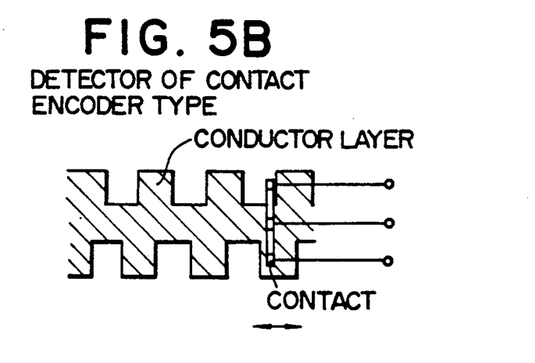

The above described object is attained by providing the focusing apparatus with manual manipulation means which is different from manual focus adjustment means using rotation of the distance ring interlocked with the focusing lens or manipulation of button switches described above, manual focus adjustment signal generating means, and motor control signal generating means. By making it possible to control the lens position in response to rotating or sliding manipulation of manipulation means using dial manipulation mechanism or slide manipulation mechanism as shown in FIG. 4A or 4B, for example, it is possible to effect the above described desired manual focusing with respect to an object located at an arbitrary distance.

The above described manual manipulation means 5 generates a detected manipulation signal in response to manual rotating (sliding) manipulation and indicates the direction and amount corresponding to the manipulation. This is attained by incorporating a potentiometer or an encoder detector as shown in FIG. 4A or 4B, for example, within the manual manipulation means. The motor control signal generation means generates motor control signals in response to the detected manipulation signal so as to move the focusing lens by the directed distance in the directed direction or stop the focusing lens.

Accordingly, it becomes possible to correctly set the position of the focusing lens in response to the manipulation of the manual focusing manipulation means and perform focusing in a sense close to that obtained when rotating the distance ring for focusing, focusing being facilitated.

DESCRIPTION OF THE PREFERRED EMBODIMENTS

Figure 3:
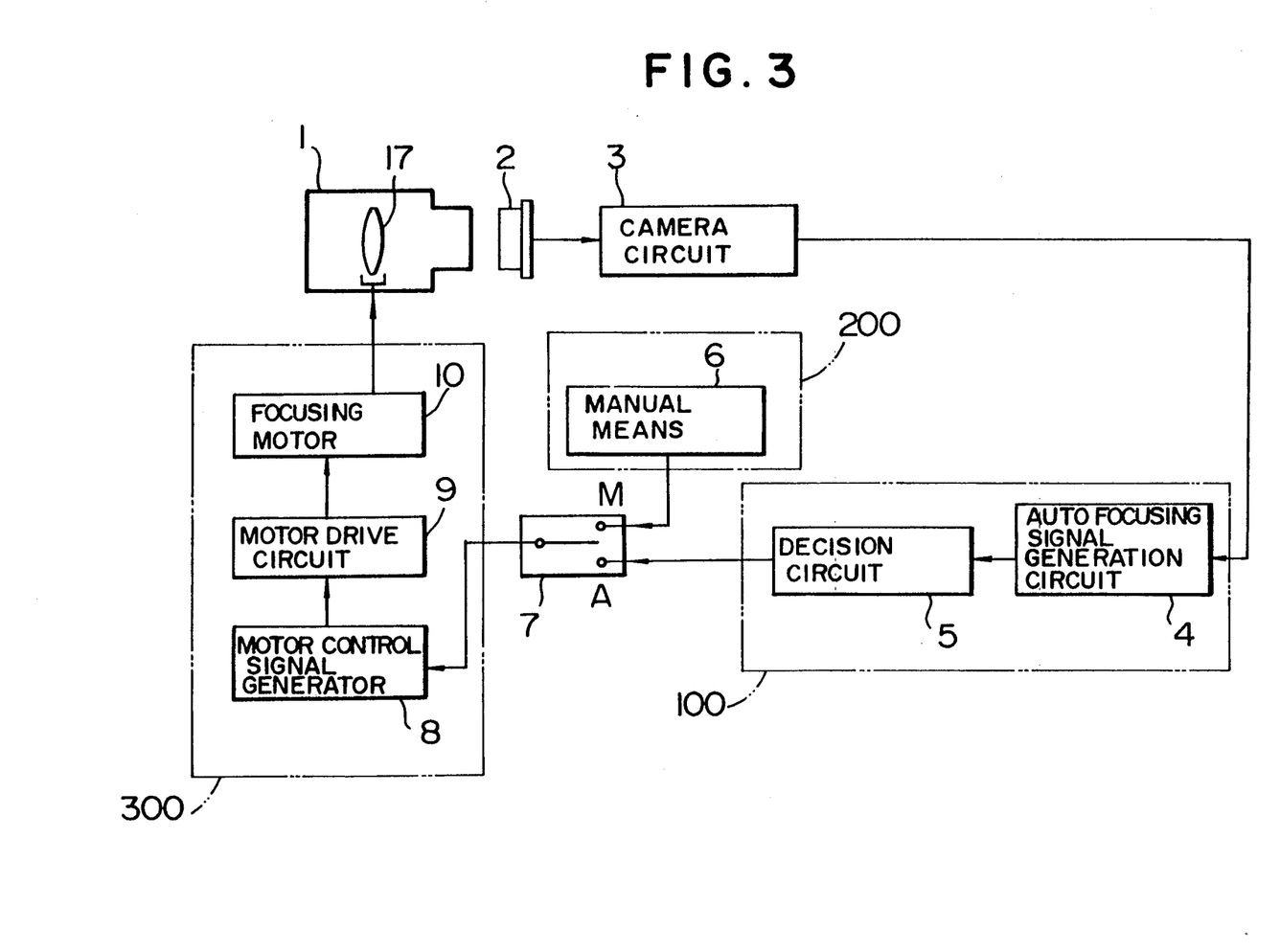
FIG. 3 is a block diagram showing a basic example of the present invention.

Embodiments of the present invention will now be described by referring to the drawings. FIG. 3 is a block diagram of a focusing apparatus of a video camera showing a basic example of the present invention. In FIG. 3, numeral 1 denotes a lens system including a focusing lens 17, 2 an image pickup device disposed behind the lens system, and 3 a camera circuit for taking out a signal induced in the image pickup device 2. Numeral 100 denotes means which generates a signal for automatic focusing. The means 100 comprises an auto focusing signal generation circuit 4 for generating an auto focusing signal from the output signal (picked-up video signal) of the camera circuit 3, for example, and a decision circuit 5 for receiving the output signal of the auto focusing signal generation circuit 4 and determining the rotation operation state of the focusing motor 10 described later such as the rotation direction of the motor and the focused state (motor stop state). Here, the auto-focusing signal generation circuit 4 is shown in the form of the TTL (Through The Lens) video system. However, the circuit 4 may also be constituted in the form of another scheme such as the infrared distance measuring scheme. Since these schemes are generally well known, they will not be described in detail here. Numeral 200 denotes means for generating a focusing adjustment signal on the basis of manual manipulation. The focusing adjustment signal generating means 200 includes manual means 6, which in turn includes a manual focusing adjustment device such as a potentiometer or an encoder of rotation or slide type as shown in FIGS. 4A, 4B and 5A, 5B and which generates the focusing adjustment signal on the basis of the manipulated amount of the manual focusing adjustment device. Numeral 7 denotes a manual (M)/automatic (A) focusing changeover switch circuit. Numeral 300 denotes electronically-controlled (power) focusing means having electronically-controlled focusing function, which receives the output signal of the focusing adjustment signal generating means 200 or the automatic focusing signal generating means 100 and which drives a focusing lens 17 of the lens system 1. The electronically-controlled focusing means 300 comprises motor control signal generator 8 for generating a motor control signal depending upon the output signal of the above described signal generating means, a motor drive circuit 9, and a focusing motor 10 for driving the focusing motor 10. As the motor drive circuit 9, the circuit as shown in FIG. 2 is used.

When it is desired to perform focusing adjustment by using manual manipulation, the changeover switch circuit 7 is switched to the manual focusing side M. If the manual focusing adjustment device of the above described manual means 6 is moved for rotation or sliding to focus on a desired object located at an arbitrary distance, a signal corresponding to the manipulation (detected voltage) is outputted at the output stage of the manual means. This output signal is supplied to the motor control signal generation means 8 via the switch circuit 7. The control signal generation means 8 successively checks the detected signals. It is now assumed that a voltage detected immediately before the manual manipulation is $V_a$ and a voltage detected after the manual manipulation is $V_b$. For example, the control signal generation means 8 checks $V_a - V_b$. If $V_a > V_b$, the control signal generation means 8 generates motor control signals so that the motor may be rotated by an amount corresponding to $|V_a - V_b|$ in the positive rotation direction. If, on the contrary, $V_a < V_b$, the control signal generation means 8 generates motor control signals so that the motor may be rotated by an amount corresponding to $|V_a - V_b|$ in the negative rotation direction. The control signals thus generated by the control signal generation means 8 are supplied to the motor drive circuit 9. In response to the manual manipulation of the manual means 6, therefore, the focusing lens 17 interlocked with the motor 10 can be controlled and stopped precisely and accurately as if the distance ring was directly rotated for focusing. Even in power focusing, therefore, focusing with high precision can be realized and handling is also convenient. Since the focusing motor 10 can be used in common with the autofocusing motor, a special cost increase is also avoided. That is to say, the present embodiment has a basic feature that the motor is driven in response to the manipulation direction and the manipulation amount of the manual manipulation means 6.

Since concrete means of the automatic focusing adjustment signal generation means 100 and its operation is well known, they will not be described herein.

Figure 6A:
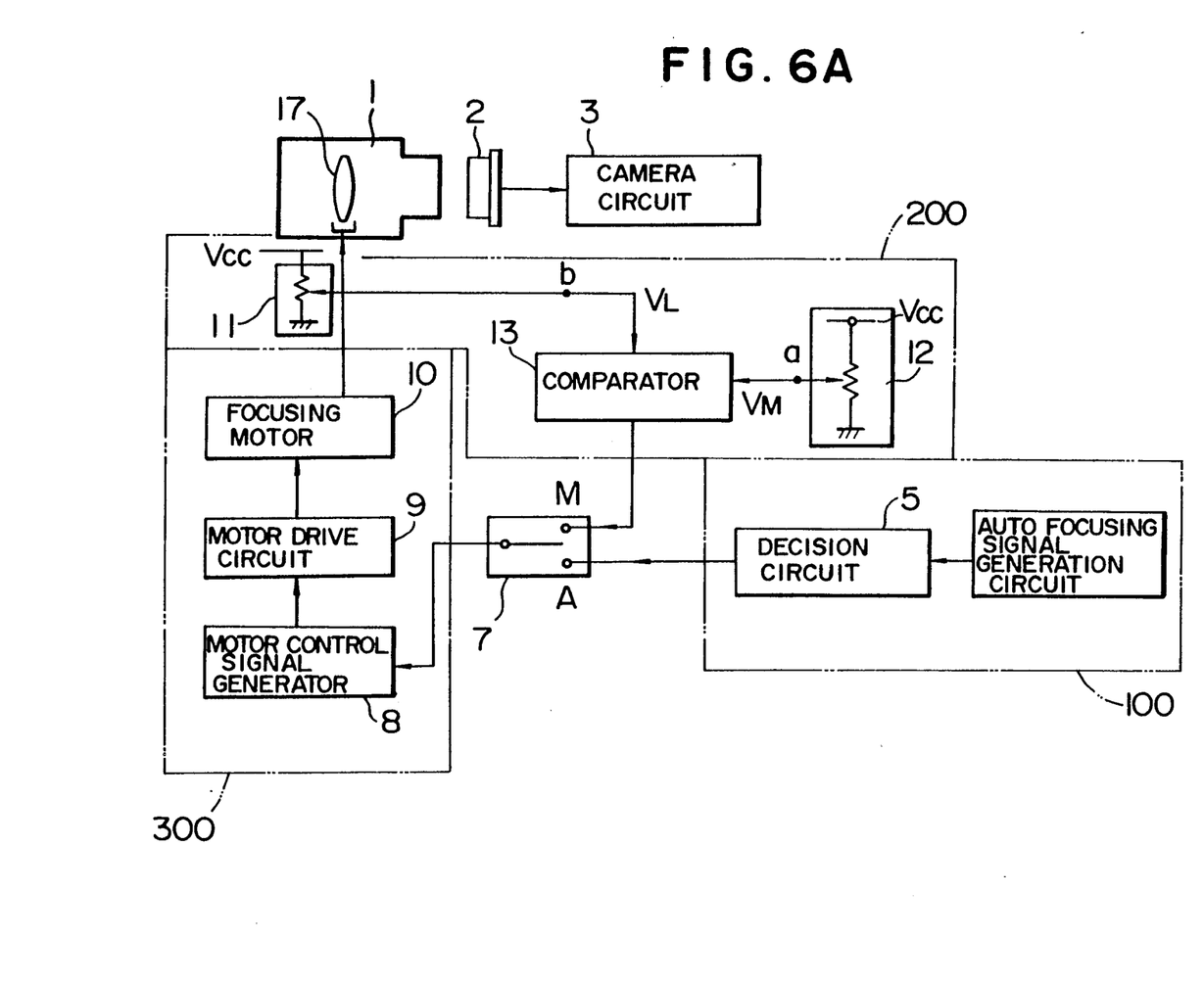
FIG. 6A is a block diagram showing a concrete example of the present invention.

FIG. 6A is a block diagram of a focusing apparatus of a video camera showing an embodiment of the present invention. In FIG. 6A, the same components as those of FIG. 3 are denoted by identical numerals and will not be described in detail. Numeral 11 denotes lens position detection means for detecting the lens position of the focusing lens 17. The lens position detection means comprises a potentiometer, for example. Numeral 12 denotes a manual focusing adjustment device comprising a potentiometer or an encoder as shown in FIG. 4A or 4B and FIG. 5A or 5B. Numeral 13 denotes a comparator for comparing the level of voltage $V_L$ at an output terminal b of the lens position detection means 11 with the level of voltage $V_M$ at an output terminal a of the manual focusing adjustment device 12 and for supplying the resultant difference voltage to the motor control signal generation means 8 via the switch circuit 7.

When it is desired to perform focusing adjustment manually, the changeover switch circuit 7 shown in FIG. 6A is switched to the manual focusing side M.

Figure 6B:
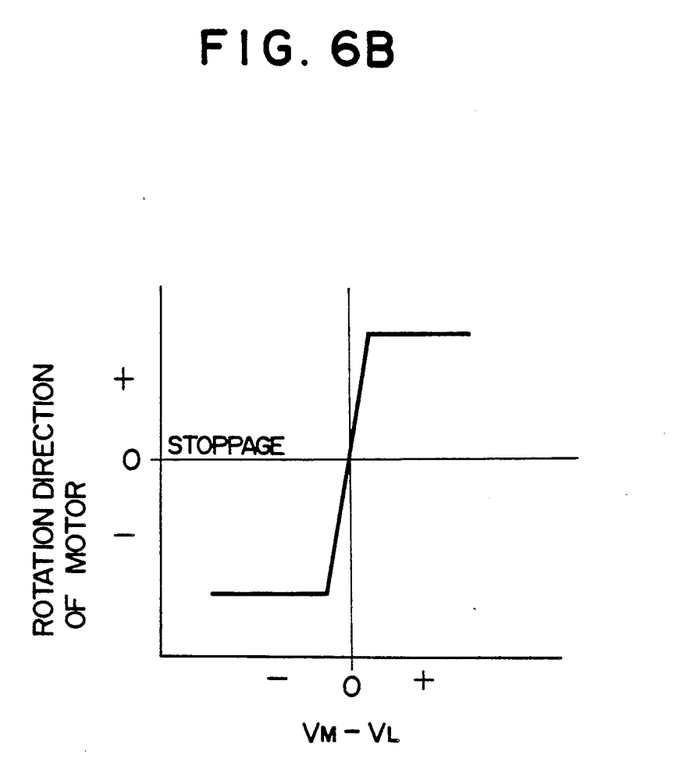
FIG. 6B is a diagram used for explaining the block diagram of FIG. 6A.

A manual focusing adjustment device 12 is so adjusted as to be focused onto a desired object located at an arbitrary distance. At this time, voltage $V_M$ corresponding to the distance of the object is outputted at a movable terminal a and supplied to one of terminals of the comparator 13. On the other hand, position detection means 11 interlocked with the focusing lens 17 and the focusing motor 10 successively outputs detected voltage corresponding to the lens position at arbitrary time onto a terminal b. The detected voltage thus outputted is supplied to the other terminal of the comparator 13 and compared with the above described manually adjusted voltage $V_M$. The amount of error $(V_M - V_L)$ detected by the comparator 13 is supplied to the motor control signal generation means 8 via the switch circuit 7. As shown in FIG. 6B, the motor control signal generation means 8 supplies a motor control voltage to the motor drive circuit 9 so that the motor 10 may be rotated in the forward direction when the error amount $(V_M - V_L)$ is positive, may be rotated in the backward direction when the error amount $(V_M - V_L)$ is negative, and may be stopped when the error amount $(V_M - V_L)$ is zero. The motor 10 is thus controlled and driven to control the position of the focusing lens 17 interlocked therewith.

In the present embodiment, a feedback control loop is constituted by the position detection means 11, the comparator 13, the switch circuit 7, the motor control signal generation means 8, the motor drive circuit 9, the motor 10 and the focusing lens 17 as described above. Accordingly, the lens position is so controlled that the above described amount of error $(V_M-V_L)$ may become zero. That is to say, the lens position can be accurately controlled and stopped in the present embodiment so as to agree with the distance defined by the movable position of the manual focusing adjusting device 12. In power focusing as well, therefore, focusing with high precision can be realized. In addition, the present embodiment is convenient to handle because only the manual focusing adjustment device 12 is rotated.

Figure 7:
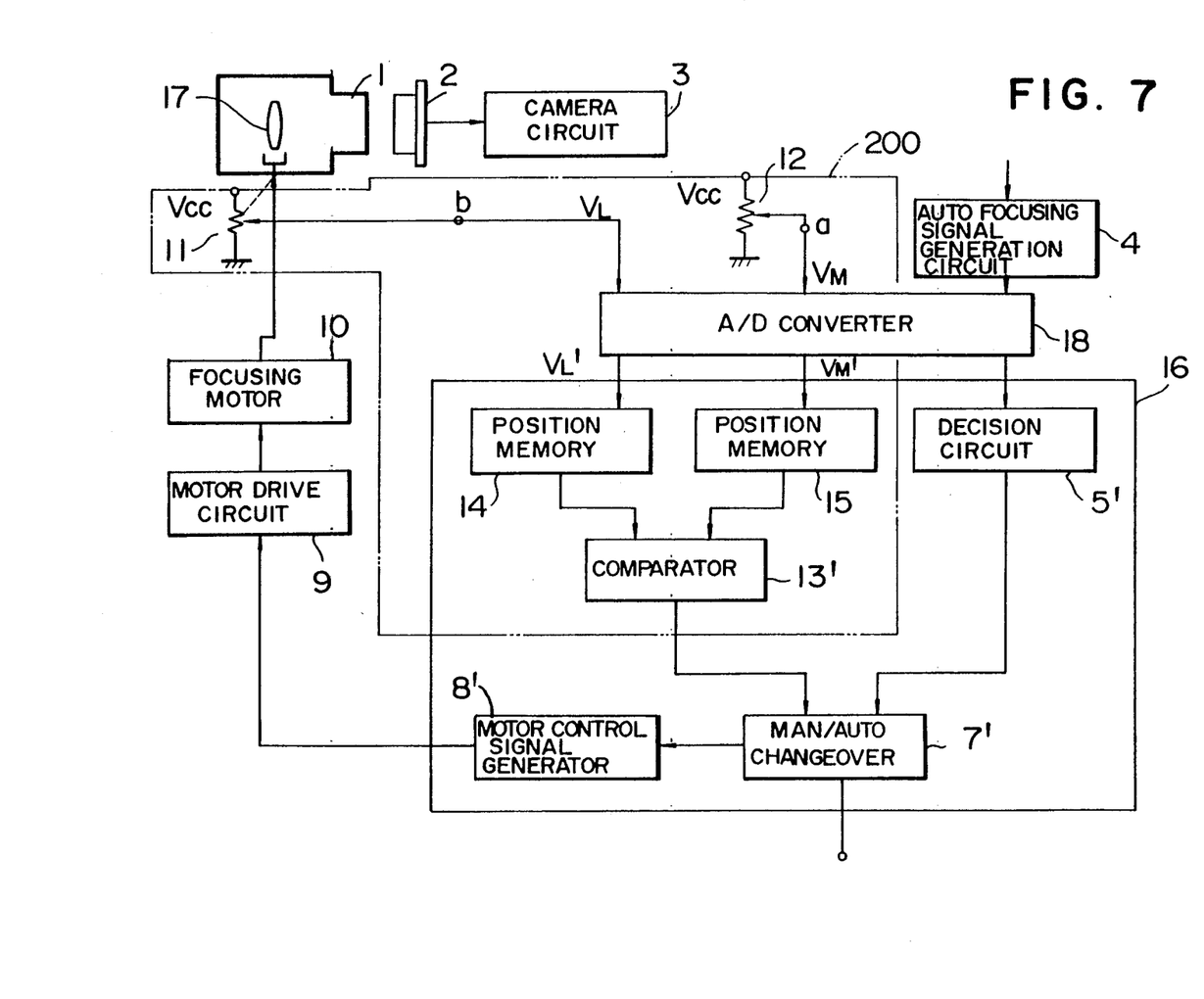
FIG. 7 is a block diagram showing another embodiment of the present invention.

FIG. 7 is a block diagram showing another embodiment of the present invention. In FIG. 7, components denoted by the same symbols and numerals as those of embodiments of FIGS. 3 and 6 have the same function and action as those of FIGS. 3 and 6 and will not be described. The present embodiment differs from the embodiment of FIG. 6 in that analog signals outputted respectively from the manual focusing adjustment device 12, the potentiometer 11 of the position detection means and the auto focusing signal generation circuit 4 are converted into digital signals by an A-D converter 18 to undergo digital signal processing. In FIG. 7, numerals 14 and 15 denote position memories for storing therein values $V_L'$ and $V_M'$ which are respectively obtained by applying A-D conversion in the A-D converter 18 to the detected voltage $V_L$ supplied from the position detecting potentiometer 11 and the detected voltage $V_M$ supplied from the manual focusing adjustment device 12. Numeral 13' denotes a comparator section for comparing the levels of the A-D converted values $V_L'$ and $V_M'$. Numeral 7' denotes a manual-/automatic changeover section for selecting either the output of the comparator 13' or the output of a decision section 5' having auto focusing decision function and for supplying the output thus selected to a motor control signal generation section 8'. These are constituted by a microcomputer 16.

A manual focusing adjustment device 12 is so adjusted as to be focused onto a desired object located at an arbitrary distance. At this time, voltage $V_M$ corresponding to the distance of the object is outputted at the movable terminal a. The A-D converted value $V_M'$ of the voltage $V_M$ is supplied to one of terminals of the comparator 13'. On the other hand, position detection means 11 interlocked with the focusing lens 17 and the focusing motor 10 successively outputs detected voltage $V_L$ corresponding to the lens position at an arbitrary time onto the terminal b. The A-D converted signal $V_L'$ is supplied to the other terminal of the comparator 13' and compared with the manually adjusted voltage $V_M'$ described above. The amount of error $(V_M' - V_L')$ detected by the comparator 13' supplied to motor control signal generation means 8' via a switch section 7'. As shown in FIG. 6B, the motor control signal generation means 8' supplies a motor control voltage to the motor drive circuit 9 so that the motor 10 may be rotated in the forward direction when the error amount $(V_{M'}-V_L)$ is positive, may be rotated in the backward direction when the error amount $(V_{M'}-V_L)$ is negative, and may be stopped when the error amount $(V_{M'}-V_L)$ is zero. The motor 10 is thus controlled and driven to control the position of the focusing lens 17 interlocked therewith.

In the present embodiment as described above, digital signals $V_L'$ and $V_M'$, which are obtained by applying A-D conversion to respective detected voltage values $V_L$ and $V_M$ of the position detection means 11 and the manual focusing adjustment device 12, are derived and memorized, and they are supplied to the comparator section 13' to detect the amount of error on the basis of both signals. That is to say, the comparator section 13', the switch section 7', the motor control signal generation section 8', and the auto focusing decision section 5' of FIG. 7 nearly function as means 13, 7, 8 and 5 of FIG. 6, respectively.

Figure 8:
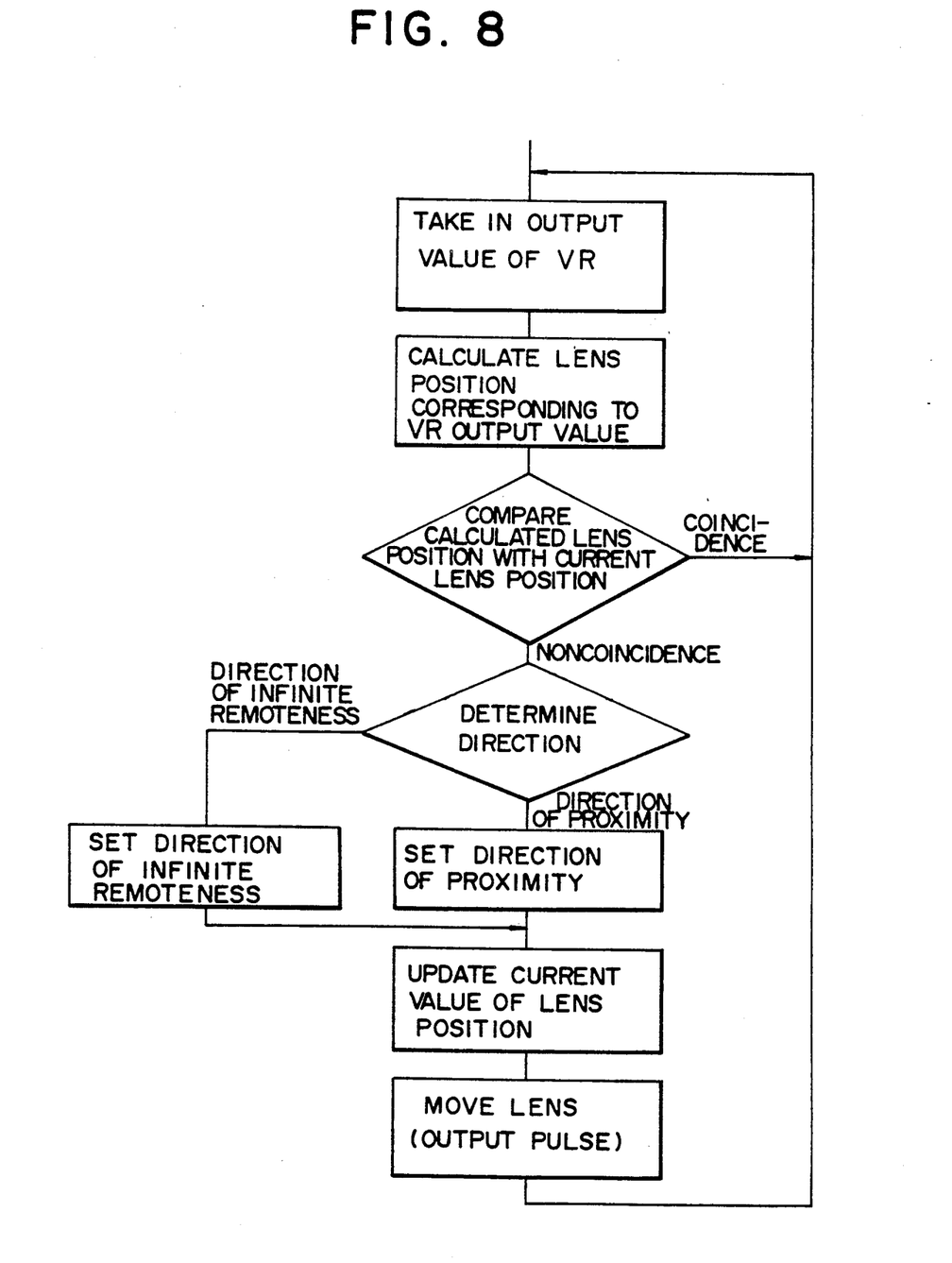
FIG. 8 is a flow chart of the microcomputer shown in FIG. 7.

Therefore, the function of the present embodiment as the manual focusing adjustment system is quite the same as that of the embodiment shown in FIG. 6. In the present embodiment, however, the digital processing portion of FIG. 7 represented by the block 16 can be simply realized by using a microcomputer in general. Further, the A-D converter 18 is also incorporated in the microcomputer. Accordingly, the present invention has a feature that special hardware is not required and the entire focusing adjustment system including the auto focusing function can be simply constituted. FIG. 8 is a flow chart for microcomputer processing.

Figure 9:
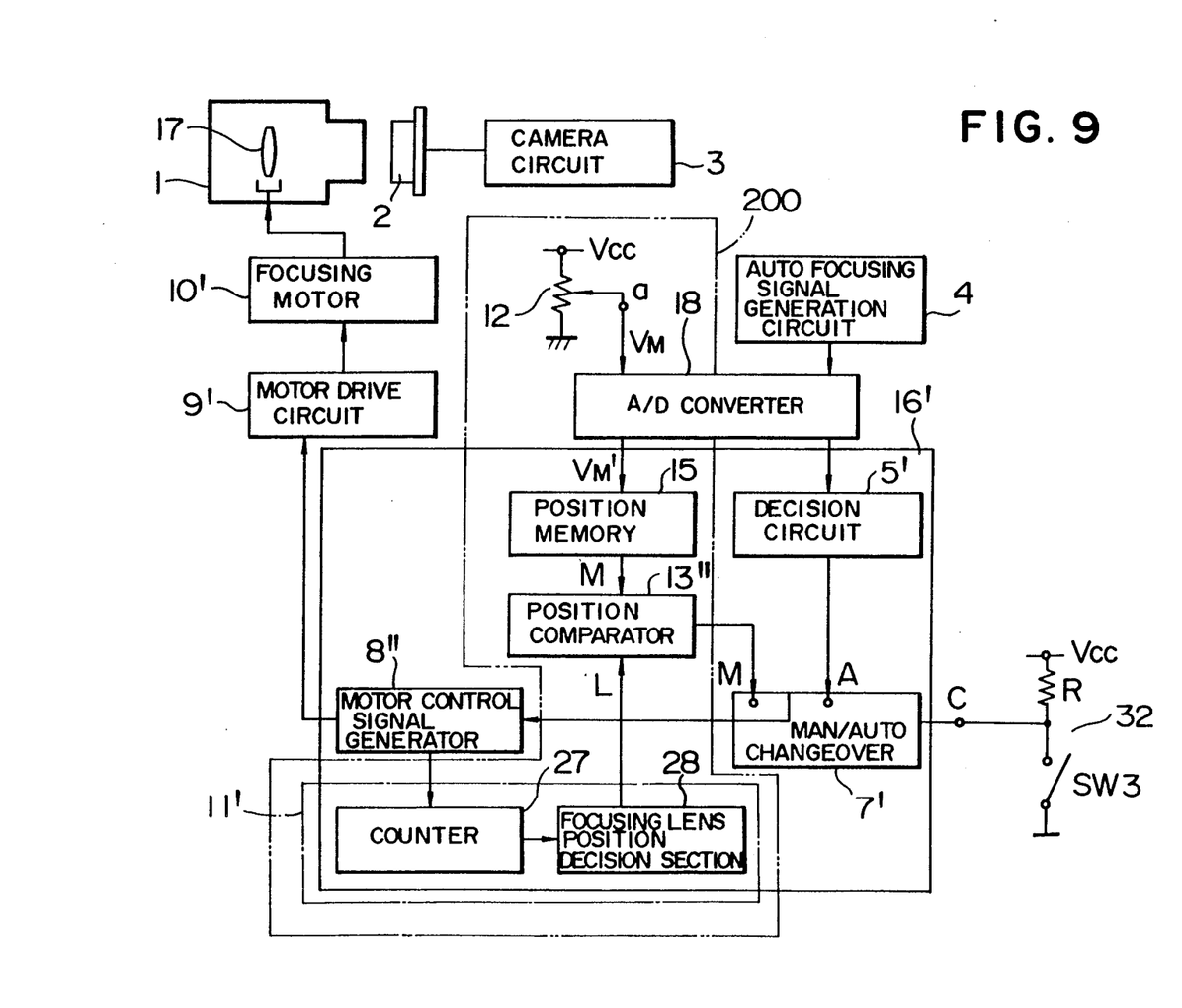
FIGS. 9 to 11 are block diagrams showing other embodiments of the present invention.

FIG. 9 is a block diagram showing a further embodiment of the present invention. The embodiment of FIG. 9 differs from the embodiments of FIG. 6A and 7 in that the position of the lens is controlled by using a motor, which can be pulse-driven, such as a pulse motor as a focusing motor 10' and the detector such as the potentiometer 11 for detecting the focusing lens position shown in FIGS. 6A and 7 is not used.

In FIG. 9, numeral 12 denotes a manual focusing adjustment device in the same way as FIGS. 6A and 7. Numeral 4 denotes an auto-focusing signal generation circuit, and numeral 18 denotes an A-D conversion circuit. Numeral 16' denotes a microcomputer. The microcomputer 16' comprises a manually adjusted position decision section (position memory) 15 for receiving and checking the signal $V_M'$ obtained by applying A-D conversion to the detected voltage $V_M$ of lens position, a position comparator section 13", a motor control signal generation (pulse signal generation) section 8", a counter section 27 and a focusing lens position decision section 28 constituting a focusing lens position detection means 11', and a manual/automatic changeover (switch) section 7'. Numeral 9' denotes a pulse motor drive circuit, and numeral 10' denotes a pulse motor for controlling the focusing lens position. The present embodiment also functions as the manual adjustment system in the same way as the embodiments of FIGS. 6A and 7.

When manual adjustment is desired, a switch SW₃ illustrated in FIG. 9 is opened, for example. At this time, H (high level) voltage is applied to a terminal c of the microcomputer 16' through a resistor R, and the M side is selected in the switch section 7' included within the microcomputer 16'.

The counter section 27 counts motor driving pulses of the motor control signal generation section 8". It is possible to know the lens position on the basis of the count. The lens position decision section 28 successively memorizes the lens position.

In order to focus on a desired object in the same way as the embodiments of FIGS. 6a and 7, therefore, position information M corresponding to the distance from the object obtained by adjusting the manual focusing adjustment device 12 and focusing lens position information L successively determined at an arbitrary time are supplied to the position comparator section 13". Position error information M-L is supplied to the motor control signal generation section 8" via the switch section 7'. The motor control signal generation section 8" outputs control pulse voltage and supplies it to the pulse motor drive circuit 9' so as to cause forward rotation when M>L, backward rotation when M<L, and stoppage when M=L. In the same way as the embodiments of FIGS. 6a and 7, this manual focusing adjustment system constitutes a feedback control loop. When the above described relation M=L is satisfied, therefore, the control system becomes stable and the motor stops to set the focusing lens at a desired position.

In the embodiment of FIG. 9 heretofore described, the position can be detected without the necessity of the focusing lens position detection means such as a potentiometer used in the embodiments of FIGS. 6a and 7. This results in a simple lens structure. Further, a pulse motor has little inertia and is capable of controlling the position with high precision. As a result, finer and precise manual focusing adjustment can be performed.

In the above described power focusing means in FIGS. 6a, 7 and 9 showing concrete examples of means, the following disadvantage is incidentally caused. First of all, a desired object is photographed, and focusing is performed by auto focusing. When the adjustment mode switch (or the manual/automatic focusing changeover switch circuit) is switched from the auto position to the manual position under the focusing state, the focusing point jumps to a lens position defined by the position of the above described manual focusing adjustment device at the instant. As a result, an abnormal photographed picture is disadvantageously caused without intention.

The invention for improving the above described disadvantage will now be described by referring to embodiments shown in FIGS. 10 and 11. In accordance with the principal point of these embodiments, the automatic/manual changeover information signal and position change information of the manual focusing adjustment device caused by manual manipulation are detected. Even if the auto focusing is changed over to the manual focusing, the lens position defined by the auto focusing operation continues to be kept so long as the manual focusing adjustment device is not manipulated to move. It is not until the focusing can be performed by the manual focusing adjustment device that a change in position of the manual adjustment device is sensed after the manipulation of the auto/manual changeover.

Figure 10:
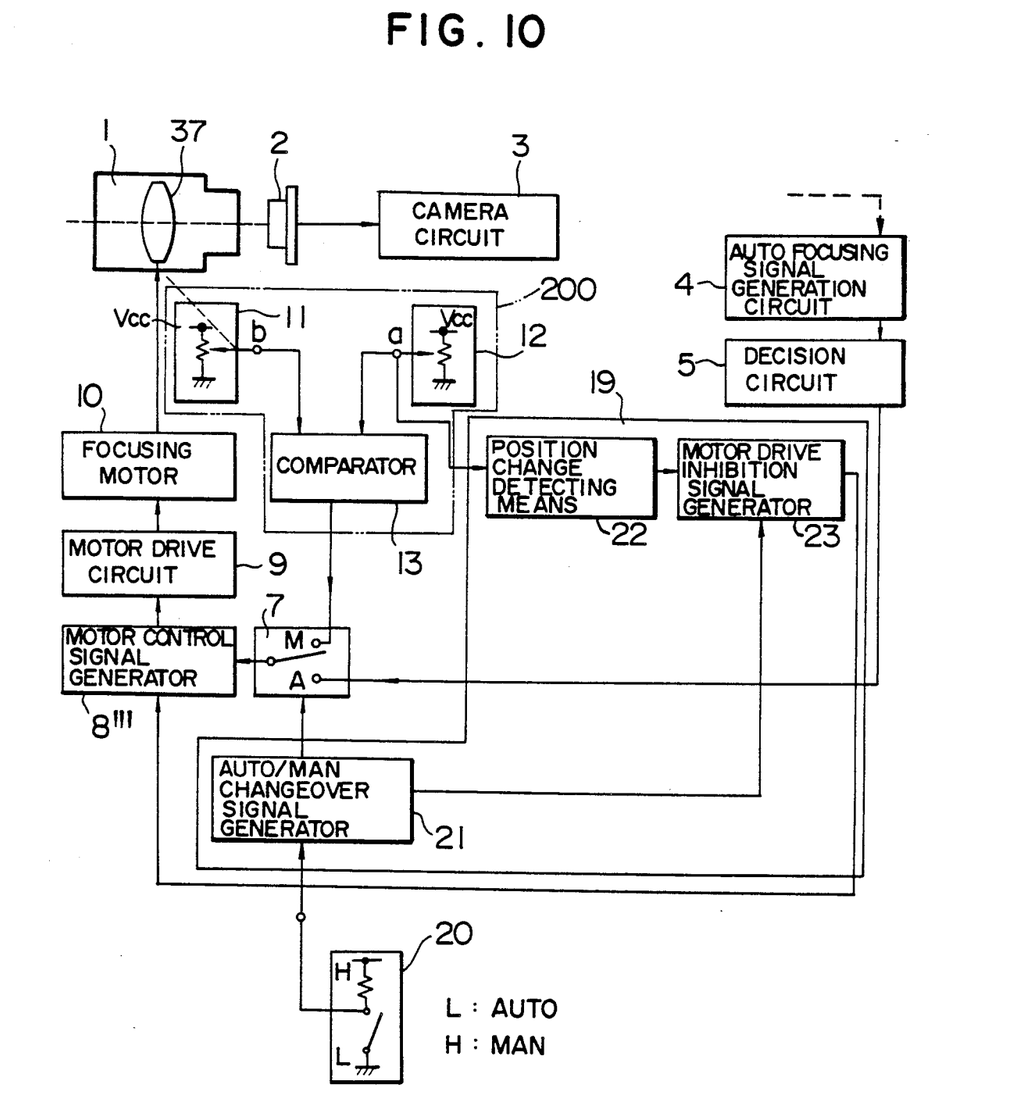

FIG. 10 shows an embodiment obtained by adding the above described improvement invention to the embodiment of FIG. 6A. In FIG. 10, the same components as those of FIG. 6A are denoted by identical numerals or identical symbols. In FIG. 10, a block 19 is a portion showing the improvement invention. Numeral 20 denotes an automatic/manual changeover switch, 21 an automatic/manual changeover signal generation circuit, 22 means for detecting a change in the manual focusing adjustment device, and 23 a motor drive inhibition signal generation circuit for supplying a motor drive inhibition (stop) control signal to the motor control signal generation circuit 8'" under a state described later. In automatic focusing, a changeover switch 20 is preferably closed to apply the L level to the changeover signal generation circuit 21. The changeover signal generation circuit 21 generates a control signal for switching the switch circuit 7 to the automatic focusing side A and a control signal for controlling the motor drive inhibition signal generation means 23. Further, at this time, the motor drive inhibition signal generation means 23 supplies such a control signal to the motor control signal generation circuit 8'" that the motor control signal generation means 8'" accepts a motor control signal supplied from the switch circuit 7 in preference to others. Accordingly, normal auto-focusing operation is maintained through a path comprising the circuits 4, 5, 7, 8'", 9 and 10 as well as the lens 17.

The switch 20 is then manipulated to open in order to switch from the auto-focusing to the manual focusing. Thereby the control signal supplied to the changeover signal generation circuit 21 changes from the L level to the H level. The changeover signal generation circuit 21 controls the changeover switch circuit 7 so as to switch it to the manual focusing side M. When a change signal such as a trigger pulse momentarily caused by the changeover manipulation from auto to manual is supplied from the changeover signal generation circuit 21 to the motor drive inhibition signal generation circuit 23, the motor drive inhibition signal generation circuit 23 generates a control signal for forcibly inhibiting (stopping) the motor drive and supplies the control signal to the motor control signal generation means 8'. That state is maintained until the position change detection means 22 detects a change in position of the manual focusing adjustment device 12 caused by manual manipulation. That is to say, the lens position defined by the auto focusing operation is maintained even when the focusing mode is switched from auto to manual. When the adjustment device 12 is then manipulated for manual adjustment, the motor drive inhibition signal generation means 23 accepts the position information of the manual focusing adjustment device 12 supplied from the position change detection means 22 and cancels the generation of the motor drive inhibition signal. Once the adjustment device 12 is manipulated, arbitrary manual adjustment can be effected via the adjustment device 12, the means 13, 7, 8''', 9 and 10, and the lens 17 thereafter. Owing to the present improvement, the jumping movement phenomenon of the lens is not caused when the focusing mode is switched from auto to manual.

Figure 11:
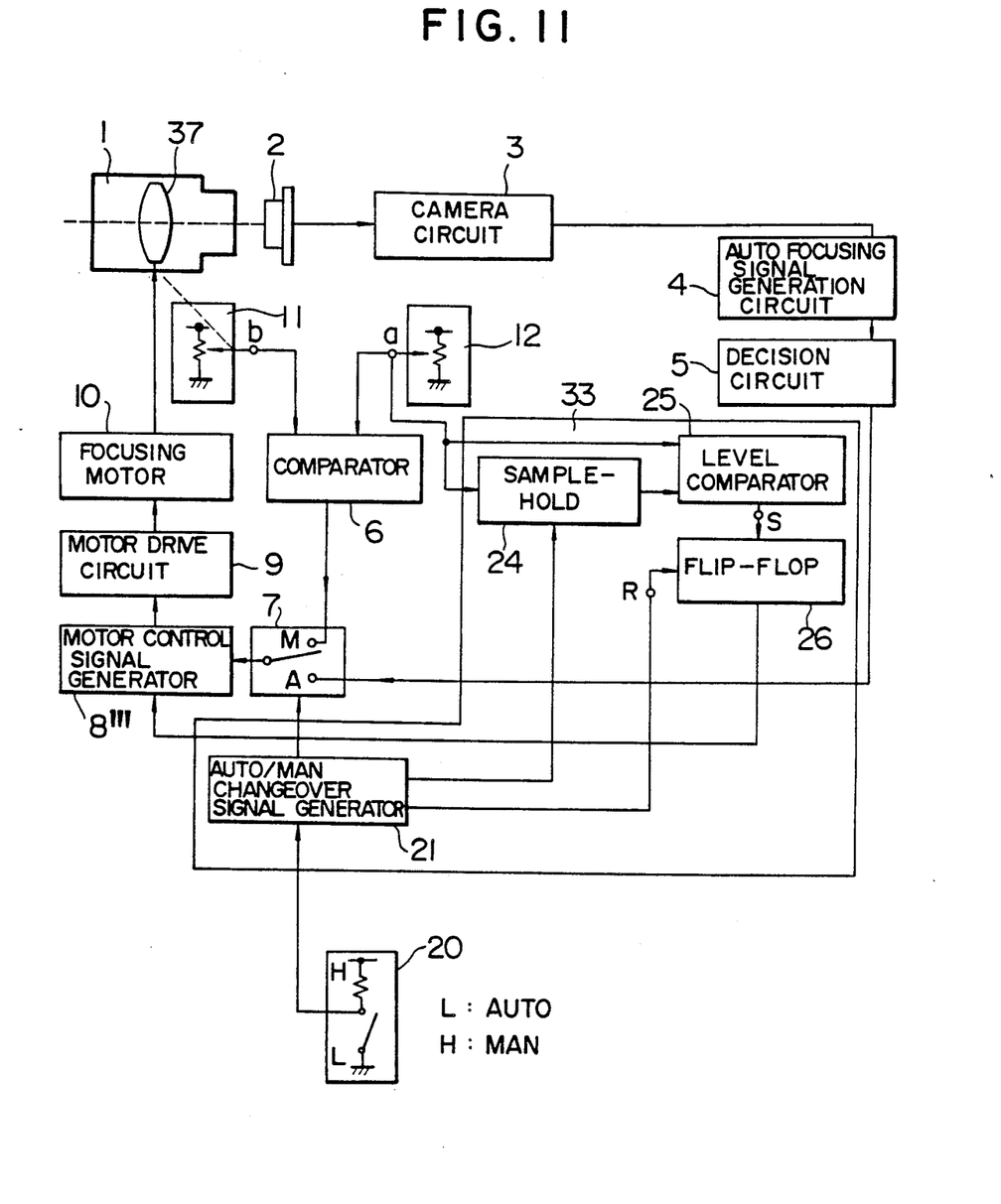
Figure 12:
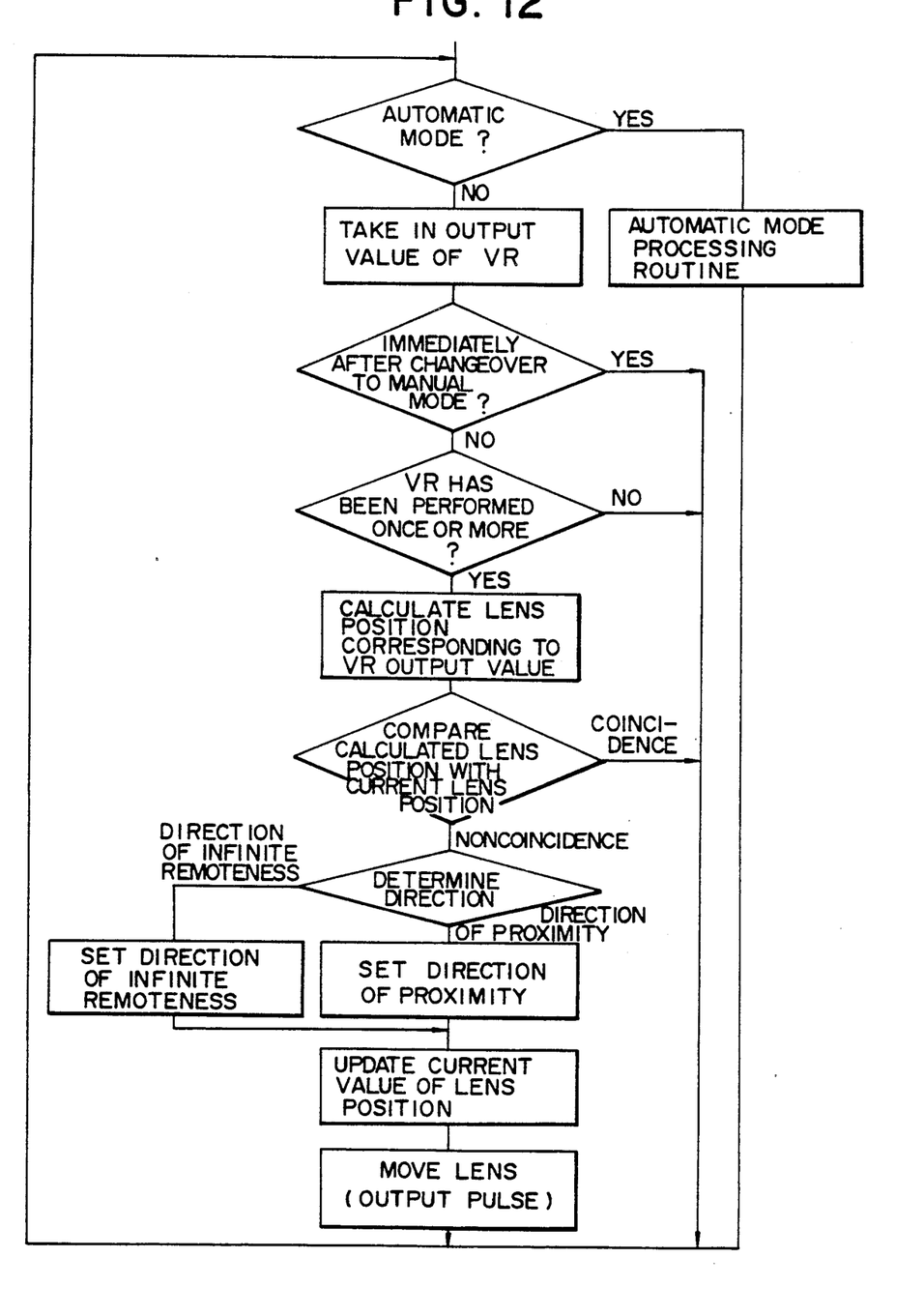
FIG. 12 is a flow chart of a microcomputer shown in FIG. 9.

An embodiment of FIG. 11 exemplifies implementation means of the position change detection means 22 and the motor drive inhibition control signal generation means 23 of the embodiment of FIG. 10 by means of concrete circuit function. The position change detection means 22 can be implemented by using a sample-and-hold circuit 24 and a level comparator circuit 25. The motor drive inhibition signal generation means 23 can be implemented by a flip-flop circuit 26. In the auto-focusing mode, the changeover switch 20 is closed to supply a control signal of L (low) level to the changeover signal generation circuit 21. The changeover switch circuit 7 is thus switched to the auto-focusing side A. Under this state, the flip-flop circuit 26 preferably outputs a H (high) level signal, which is supplied to the motor control signal generation means 8'''. When the control signal of the H level is supplied to the motor control signal generation means 8''', the means 8''' accepts the control signal supplied from the changeover switch circuit 7 in preference to others. That is to say, the normal auto focus operation state is maintained. When the switch 20 is opened to change the mode from auto to manual, a control signal of H level is supplied to the changeover signal generation circuit 21, which in turn generates a control signal for switching the changeover switch circuit 7 to the manual focusing side M. Further, at the timing of change from the L level to the H level, the changeover signal generation circuit 21 generates a sample-and-hold pulse and a reset pulse and supplies them to the sample-and-hold circuit 24 and reset terminal R of the flip-flop circuit 26, respectively. The detected voltage corresponding to the position of the manual focusing adjustment device 12 at that time is held at the output of the sample-and-hold circuit. So long as the adjustment device 12 is not manipulated, therefore, the level comparator circuit 25 does not generate any detected signal. Upon application of the above described reset pulse generated at the moment of switching from auto to manual, the output of the flip-flop circuit 26 changes from the H level to the L level. Since the motor control circuit 8''' is supplied with the control signal of the L level, the circuit 8''' maintains the motor drive inhibition (stop) state irrespective of the control signal supplied from the switch changeover circuit 7. When the adjustment device 12 is then manipulated for manual focusing adjustment, the comparator circuit 25 is supplied with voltage corresponding to the position of the manual adjustment device 12 and voltage held by the sample-and-hold circuit 24 immediately before the manipulation. Accordingly, the level detector circuit 25 detects the difference. When it is detected that the adjustment device 12 has been manipulated, the level detector circuit 25 outputs a set pulse. As a result, the output of the flip-flop circuit 26 is set to the H level until the above described reset pulse is subsequently supplied. Therefore, the motor control signal generation means 8''' accepts the control signal supplied from the switch circuit 7 in preference to others again. Focusing in response to the manipulation of the adjustment device 12 thus becomes possible. FIG. 12 shows a flow chart for the case where the above described improvement (improvement of FIG. 9) is implemented by using a microcomputer.

When the mode is changed over from auto to manual, the fact that the changeover has been performed (changeover signal "ON") is memorized, and the VR output (output of the adjustment device) immediately after the changeover is memorized in a memory. That is to say, processing does not enter a routine for driving the pulse motor and returns to the top of the routine while the above described changeover signal is "ON". The "OFF" condition of the changeover signal is satisfied by manipulating the adjustment device once or more. To be specific, the adjustment device is considered to have been manipulated when the VR output value obtained immediately after the changeover from auto to manual differs from the VR output value obtained thereafter. By manipulation of the adjustment device, the changeover signal changes to "OFF". Thereafter, the lens moves to a lens position corresponding to the VR output value as described before.

Even if the mode switch 20 is changed over from auto to manual, the focusing state onto the object obtained in the auto focusing operation is maintained until the manual focusing adjustment device 12 is manipulated. Even if the mode switch is changed over from auto to manual, therefore, the above described disadvantage is not caused.

Focusing is typically performed by rotating the front lens. As a matter of course, however, the compensator lens group 33, a part of the compensator lens group 33, the imaging lens group 34, or a part of the imaging lens group 34 among the lenses of FIG. 1 may be used as the focusing lens. If a light weight compensator lens or an imaging lens is used as the focusing lens, a small-sized, low-torque pulse motor may be used, and the influence of the inertia or the like is further decreased. In addition, the position of the front lens may be fixed. In cooperation with elimination of the detection mechanism, a compact lens design becomes possible.

Owing to the present invention, the position of the focusing lens can be controlled finely in response to the position of the manual focusing adjustment device. Even in power focusing, therefore, it becomes possible to perform focusing with respect to an arbitrary desired object to be photographed suitably, smoothly and with high precision. In addition, compact commodity design can be realized without inconvenience.

We claim:

1. A focusing apparatus for a video camera, comprising:
    a lens system including a focusing lens;
    focusing adjustment signal generation means including manual manipulation means, said focusing adjustment signal generation means outputting a focusing adjustment signal corresponding to manual manipulation of said manual manipulation means; and electronically-controlled focusing means for receiving said focusing adjustment signal outputted by said focusing adjustment signal generation means and for controlling said focusing lens, said electronically-controlled focusing means comprising control signal generation means for sensing a direction and an amount of said manual manipulation of said manual manipulation means on the basis of the focusing adjustment signal outputted by said focusing adjustment signal generation means and for generating a control signal for controlling the position of said focusing lens in response to said sensed direction and amount of said manual manipulation to effect focusing of said focusing lens and a motor for receiving said control signal and for driving said focusing lens.

2. A focusing apparatus according to claim 1, wherein said manual manipulation means includes a manual focusing adjustment device for effecting focusing of said focusing lens and a signal generation circuit for outputting said focusing adjustment signal corresponding to manual manipulation of said manual focusing adjustment device.

3. A focusing apparatus according to claim 2, wherein said manual focusing adjustment device comprises one of a potentiometer and an encoder circuit.

4. A focusing apparatus according to claim 3, wherein said focusing lens comprises one of a front lens constituting a zoom lens, a compensator lens and an imaging lens.

5. A focusing apparatus according to claim 2, wherein said focusing lens comprises one of a front lens constituting a zoom lens, a compensator lens and an imaging lens.

6. A focusing apparatus according to claim 1, wherein said focusing adjustment signal generation means comprises:

lens position detection means associated with said focusing lens, said lens position detection means outputting a first position information signal corresponding to the position of said focusing lens;

a manual focusing adjustment device for outputting a second position information signal corresponding to a manual focusing adjustment position of said manual manipulation means;

a comparator circuit for comparing said first position information signal with said second position information signal and for outputting a difference signal corresponding to the difference between said first position information signal and said second position information signal; and a supplying circuit for supplying the difference signal outputted by said comparator circuit to said control signal generation means of said electronically-controlled focusing means as said focusing adjustment signal;

wherein said lens position detection means, said comparator circuit, said supplying circuit, said control signal generation means, said motor, and said focusing lens constitute a feedback control loop, and wherein said control signal generation circuit generates said control signal so as to make the difference signal outputted by said comparator circuit equal to zero.

7. A focusing apparatus according to claim 6, wherein said manual focusing adjustment device comprises one of a potentiometer and an encoder circuit.

8. A focusing apparatus according to claim 7, wherein said focusing lens comprises one of a front lens constituting a zoom lens, a compensator lens and an imaging lens.

9. A focusing apparatus according to claim 6, wherein said focusing lens comprises one of a front lens constituting a zoom lens, a compensator lens and an imaging lens.

10. A focusing apparatus according to claim 6, wherein said lens position detection means comprises a potentiometer.

11. A focusing apparatus according to claim 10, wherein said focusing lens comprises one of a front lens constituting a zoom lens, a compensator lens and an imaging lens.

12. A focusing apparatus according to claim 1, wherein said motor comprises a pulse motor which is driven by pulse signals;

wherein said focusing adjustment signal generation means comprises:

lens position detection means for counting said pulse signals, for determining the position of said focusing lens on the basis of said counted pulse signals, and for outputting a first position information signal corresponding to the position of said focusing lens;

a manual focusing adjustment device for outputting an analog signal corresponding to a manual focusing adjustment position of said manual manipulation means;

circuit means for converting the analog signal outputted by said manual focusing adjustment device into a digital signal and for outputting said digital signal as a second position information signal;

comparator means for comparing said first position information signal and said second position information signal and for outputting a difference signal corresponding to the difference between said first position information signal and said second position information signal; and circuit means for supplying said difference signal outputted by said comparator means to said control signal generation means as said focusing adjustment signal; and wherein said control signal generation means comprises a circuit for receiving said difference signal and for generating said pulse signals as said control signal.

13. A focusing apparatus according to claim 12, wherein said focusing lens comprises one of a front lens constituting a zoom lens, a compensator lens and an imaging lens.

14. A focusing apparatus according to claim 1, wherein said focusing lens comprises one of a front lens constituting a zoom lens, a compensator lens and an imaging lens.

15. A focusing apparatus for a video camera, comprising:

a focusing lens;

a focusing motor mechanically coupled to said focusing lens;

lens position detection means for detecting the position of said focusing lens and for outputting a position detection voltage corresponding to the position of said focusing lens;

a manual focusing adjustment device having a manually manipulable movable terminal, said manual focusing adjustment device outputting a manual manipulation detection voltage corresponding to manual manipulation of said movable terminal;

comparator means for successively comparing said position detection voltage outputted by said lens position detection means with said manual manipulation detection voltage outputted by said manual focusing adjustment device and for outputting an error signal corresponding to the difference between said detection voltages;

motor drive control means for driving said focusing motor; and feedback means for feeding back the error signal outputted by said comparator means to said motor drive control means so as to cause said motor drive control means to drive said focusing motor to position said focusing lens at an arbitrary desired position corresponding to the position of said movable terminal of said manual focusing adjustment device;

wherein said focusing lens is manually focusable on a desired object in a manual focusing mode by manually manipulating said movable terminal of said manual focusing adjustment device.

16. A focusing apparatus according to claim 15, wherein the focusing motor comprises a pulse motor which is driven by pulse signals, and wherein said lens position detection means comprises means for detecting the position of said focusing lens by counting said pulse signals.

17. A focusing apparatus according to claim 16, further comprising:

automatic focusing means for automatically focusing said focusing lens on a desired object in an automatic focusing mode;

mode changeover switch means for changing between said automatic focusing mode and said manual focusing mode; and means for keeping the focusing lens at a position attained at a point in time during said automatic focusing mode immediately before mode changeover from said automatic focusing mode to said manual focusing mode until such time that said movable terminal of said manual focusing adjustment device is manually manipulated to manually focus said focusing lens on a desired object.

18. A focusing apparatus according to claim 15, further comprising:

automatic focusing means for automatically focusing said focusing lens on a desired object in an automatic focusing mode;

mode changeover switch means for changing between said automatic focusing mode and said manual focusing mode; and means for keeping the focusing lens at a position attained at a point in time during said automatic focusing mode immediately before mode changeover from said automatic focusing mode to said manual focusing mode until such time that said movable terminal of said manual focusing adjustment device is manually manipulated to manually focus said focusing lens on a desired object.

* * * * *